US007702770B1

(12) United States Patent
Potluri

(10) Patent No.: US 7,702,770 B1

(45) Date of Patent: Apr. 20, 2010

(54) WEB SERVICES ENTERPRISE INTEGRATION WITH SERVICE ORIENTED ARCHITECTURE

(75) Inventor: Dora Potluri, Plano, TX (US)

(73) Assignee: Sprint Communications Company L.P., Overland Park, KS (US)

( * ) Notice: Subject to any disclaimer, the term of this patent is extended or adjusted under 35 U.S.C. 154(b) by 878 days.

(21) Appl. No.: 11/342,090

(22) Filed: Jan. 27, 2006

(51) Int. Cl.
*G06F 15/173* (2006.01)
*G06F 15/16* (2006.01)

(52) U.S. Cl. ....................... 709/223; 709/224; 709/225; 709/232

(58) Field of Classification Search ................. 709/238, 709/230, 223, 217
See application file for complete search history.

(56) References Cited

U.S. PATENT DOCUMENTS 6,856,995 B1 * 2/2005 Ibitayo et al. ............... 707/102
6,874,008 B1 * 3/2005 Eason et al. ................ 709/201
2002/0111922 A1 * 8/2002 Young et al. .................. 705/80
2002/0138556 A1 * 9/2002 Smithline et al. ........... 709/203
2003/0149581 A1 * 8/2003 Chaudhri et al. ............... 705/1
2004/0006516 A1 * 1/2004 Anagol-Subbarao et al. .. 705/26
2004/0019684 A1 * 1/2004 Potter et al. ................. 709/227
2004/0059749 A1 * 3/2004 Frey et al. ............... 707/103 R
2004/0103389 A1 * 5/2004 Song et al. .................. 717/107
2006/0036448 A1 * 2/2006 Haynie et al. .................. 705/1
2006/0143267 A1 * 6/2006 Smithline et al. ........... 709/203
2007/0250426 A1 * 10/2007 Demirjian ................. 705/36 R

OTHER PUBLICATIONS

Kim, et al., "Development of an Object-Oriented Framework for Intranet-Based Groupware Systems," IEEE Software Engineering Department ETRI-Computer & Software Technology Lab, 161 Kajong-Dong, Yusong-Gu, 305-350, Korea, 2001, 7 pages.

* cited by examiner

*Primary Examiner*—Wing F Chan
*Assistant Examiner*—Razu A Miah

(57) ABSTRACT

A system and method for accessing a business logic module is provided. The system comprises a client that calls an interface to send a stateful message. The system also comprises a stateless session bean which receives the stateful message from the interface and calls the business logic module to perform a function.

17 Claims, 3 Drawing Sheets

200

100

200

WEB SERVICES ENTERPRISE INTEGRATION WITH SERVICE ORIENTED ARCHITECTURE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present disclosure is directed to enterprise integration, and more particularly, but not by way of limitation, to a system and method for implementing a service oriented architecture.

BACKGROUND OF THE INVENTION

An enterprise computing environment may contain one or more business logic modules (BLM). A BLM is a piece of software that performs a specific task or function. For example, a BLM is operable to promote the exchange of data, such as by retrieving data from a database and returning that data to the calling application. A BLM is typically written only when the need to retrieve such data and/or perform that task or function arises. Over time, hundreds or even thousands of BLMs may be written to perform various tasks.

In this type of architecture, internal applications may natively call a given BLM via a message queue. However, if an external non-native application wants access to a BLM, a web services wrapper ("wrapper") may need to be written for that BLM, so that the BLM is accessible to external applications.

Writing a web services wrapper for each BLM may be undesirable for several reasons. First, writing a wrapper for each BLM means that if, for example, an external application that needs access to three hundred BLMs, would require that three hundred web services wrappers would need to be written. Second, because a BLM typically performs a very basic task or function, writing the code for the wrapper may involve more coding than the code written for the BLM. Third, the computing overhead for a call to a BLM is increased because each time an external party calls a BLM, that BLM's wrapper is also executed.

SUMMARY OF THE INVENTION

An embodiment of the present disclosure is a system for accessing a business logic module. The system comprises a client that calls an interface to send a stateful message. The system also comprises a stateless session bean which receives the stateful message from the interface and calls the business logic module to perform a function.

In one embodiment, a method for accessing a business logic module is provided. The method comprises a client calling an interface to create a stateful message. The method also comprises sending the stateful message to a stateless session bean. The method also provides that responsive to the stateless session bean receiving the stateful message a business logic module is called.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION OF THE PREFERRED EMBODIMENTS

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein, but may be modified within the scope of the appended claims along with their full scope of equivalents.

In implementing a Service Oriented Architecture, the present system creates a client layer, an interface layer, a stateless session bean layer, and a core business logic module (BLM) functionality layer. All the layers, except for the client layer, are encapsulated using JAVA 2 Enterprise Edition, allowing for reusability of components. The use of stateless components allows for greater scalability. Further, decoupling the BLM layer from the interface layer allows the interface to avoid any queues and directly access BLM functionality via the stateless session beans layer. In this manner, the advantages of web services may be achieved without rewriting each and every BLM as, for example, a web service. Specifically, the stateless session bean insulates the client, JAVA and web services clients, for example, from the BLM and its functionality. This system accelerates enablement of web services service oriented architecture by using the current BLMs. Any additional desired functionality or changes to existing BLM functionality may then be achieved by modifying, rewriting, or replacing the BLMs at some later, and perhaps more convenient, time.

Figure 1:
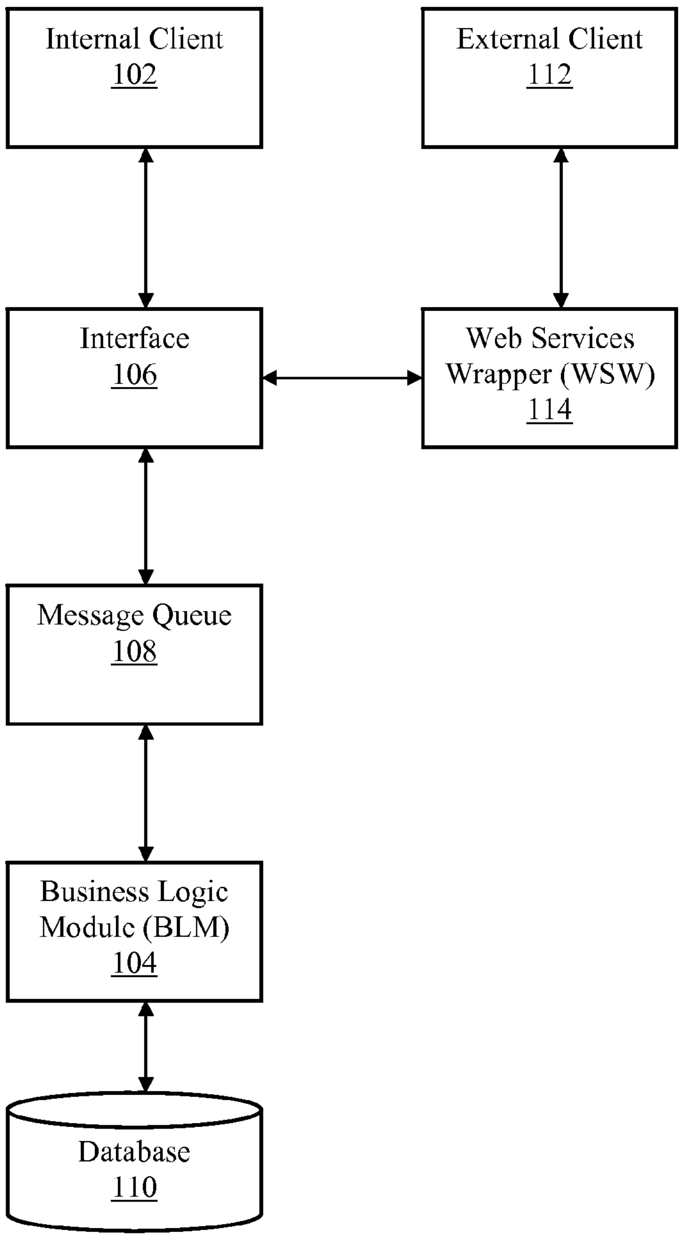
FIG. 1 illustrates a block diagram of a prior art architecture.

Turning now to FIG. 1, a block diagram of an architecture 100 previously used is depicted. In architecture 100, if internal client 102 wants to call business logic module (BLM) 104 to perform a specific task, then internal client 102 makes a call to an interface 106, which places a command for BLM 104 in a message queue 108. The message queue 108 then passes the command to BLM 104. BLM 104 performs the command or task, such as on database 110. Depending on the type of command performed, BLM 104 may pass back information such as any retrieved or modified data, and whether the command was successful. BLM 104 may pass this information back to internal client 102 via the message queue 108 and interface 106. Examples of the types of functions that BLM 104 might perform include retrieving the minutes of use (MOU) for a specific wireless phone subscriber, changing a user password, or adding a new feature to a subscriber's plan.

If an external client, such as external client 112 wants to call BLM 104, web services wrapper (WSW) 114 is used to allow external client 112 access to BLM 104. To access BLM 104, external client 112 calls WSW 114, WSW 114 calls the interface 106, and interface 106 places a command on the message queue 108 for BLM 104. BLM 104 then carries out the command on database 110 and passes back information, if appropriate, such as the success or failure of the command, and any retrieved or modified data, to WSW 114. Finally, WSW 114 passes the information back to external client 112.

Figure 2:
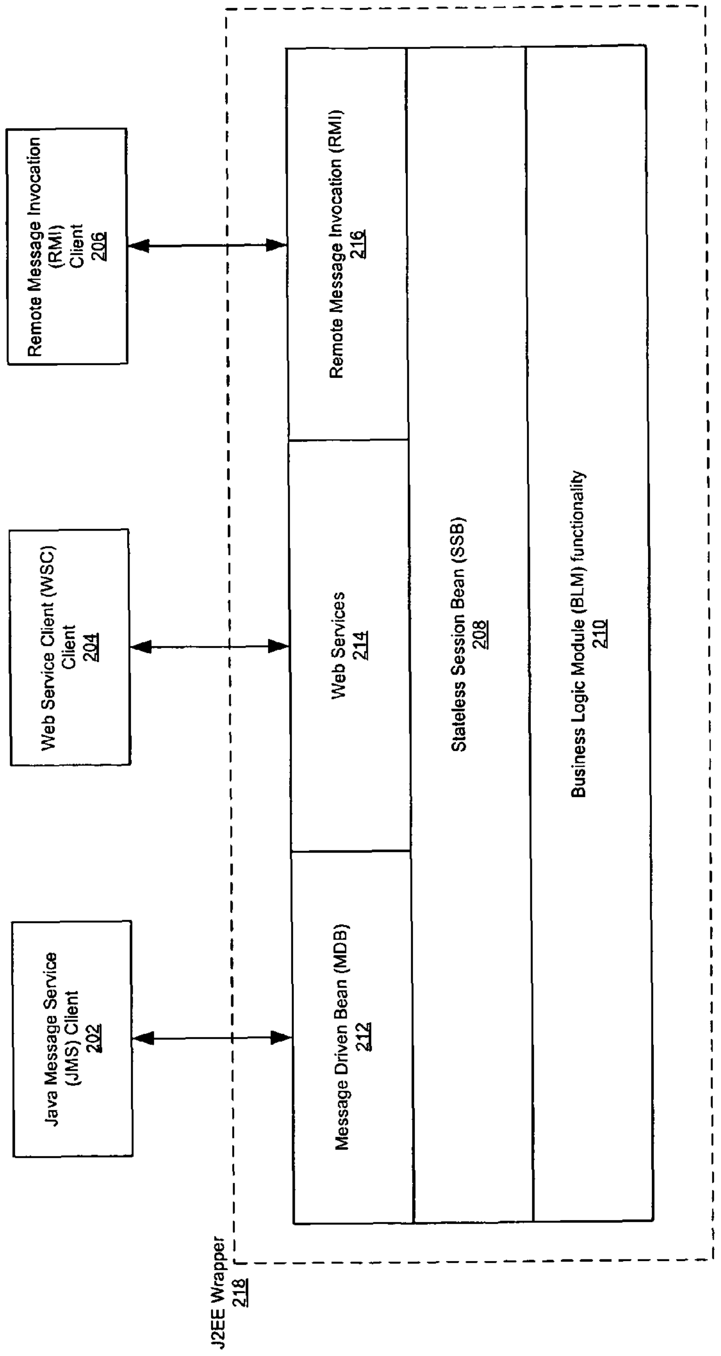
FIG. 2 illustrates a block diagram of a service oriented architecture according to one embodiment of the present disclosure.

Turning now to FIG. 2, a block diagram is depicted of a service oriented architecture 200 according to one embodiment of the present disclosure. In service oriented architecture 200, three types of clients are shown for illustration purposes. JAVA Message Service Client (JMS) 202 is an internal client. Web Services Client (WSC) 204 is an external client. Remote Messaging Invocation Client (RMI) 206 represents another type of internal client.

In service oriented architecture 200, stateless session bean (SSB) 208 provides a uniform interface to core BLM functionality 210. A bean is a reusable JAVA software component. The various clients, such as JAVA Client 202, Web Services Client 204, and RMI Client 206, have their own defined interfaces that allow access to stateless session bean 208 and BLM functionality 210. In particular, JAVA Client 202 uses message driven bean (MDB) 212 to access stateless session bean 208 and BLM functionality 210. Similarly, Web Services Client 204 uses web services 214 to access stateless session bean 208 and BLM functionality 210, and RMI Client 206 uses remote message invocation (RMI) 216 to access stateless session bean 208 and BLM functionality 210.

Message driven bean 212 is a stateless component for processing asynchronous JAVA message service (JMS) messages. Because JMS messages are stateful, message driven bean 212 does not have to save any state for later restoration in case the system or a component in the system goes down. Instead, the JAVA Client 202 client is given the responsibility of sending a stateful message. Because message driven bean 212 is stateless, message driven bean 212 can be implemented using less complex code than if message driven bean 212 was implemented as a stateful component. Similarly, stateless session bean 208 is stateless and expects to receive stateful messages.

As mentioned above, the interface between JAVA Client 202 and message driven bean 212 is asynchronous. Both the interface between Web Services Client 204 and web services 214, and the interface between RMI client 206 and RMI 216, are synchronous. Stateless session bean 208 can accommodate both asynchronous and synchronous interfaces. Web services are modular applications that can be created, located, and invoked using the Web. Web services allow a company to offer an external party access to selected portions of the company's internal, enterprise data.

Message driven bean 212, web services 214, RMI 216, stateless session bean 208, and BLM functionality 210 all comprise part of J2EE wrapper 218. J2EE is JAVA 2 Platform Enterprise Edition which provides a toolbox of components that can be used for building a J2EE wrapper, such as J2EE wrapper 218.

The use of stateless, rather than stateful components, such as message driven bean 212 and stateless session bean 208, allows these components to be relatively small and less complex to code, resulting in better scalability than the standard BLM functionality described in FIG. 1. Service oriented architecture 200 also provides a uniform, standards based interface for accessing BLM functionality 210, while decoupling BLM functionality 210 from clients JMS Client 202, Web Services Client 204, and RMI Client 206.

Decoupling BLM functionality 210 from clients JMS Client 202, Web Services Client 204, and RMI Client 206 allows each BLM to be rewritten if needed, to add additional functionality, or to port the BLM from an older programming language, such as C++, to a more modern programming language, such as Java. Also, the service oriented architecture 200 provides that stateless session bean 208 only needs to be written or coded once, and new clients can be easily accommodated by creating a defined interface between the client and stateless session bean 208.

The interface between the defined interfaces, such as message driven bean 212, web services 214, and RMI 216, and stateless session bean 208 are 1:1, in other words, one call from a client to a defined interface results in one call to stateless session bean 208. The interface between stateless session bean 208 and BLM functionality 210 however is 1:n, so that one call to stateless session bean 208 might result in one call to BLM functionality 210, or multiple calls to BLM functionality 210. Instead of a client having to make multiple calls to BLM functionality 210, a new SSB function can be created using the service oriented architecture 200 so that the client makes one call to stateless session bean 208, and then stateless session bean 208 makes multiple calls to different BLM functions in BLM functionality 210 in a specified order.

It is also possible to incorporate existing BLM functionality, or new BLM functions, directly into stateless session bean 208. Thus, in an alternate embodiment, some or all of BLM functionality 210 is incorporated into stateless session bean 208.

Figure 3:
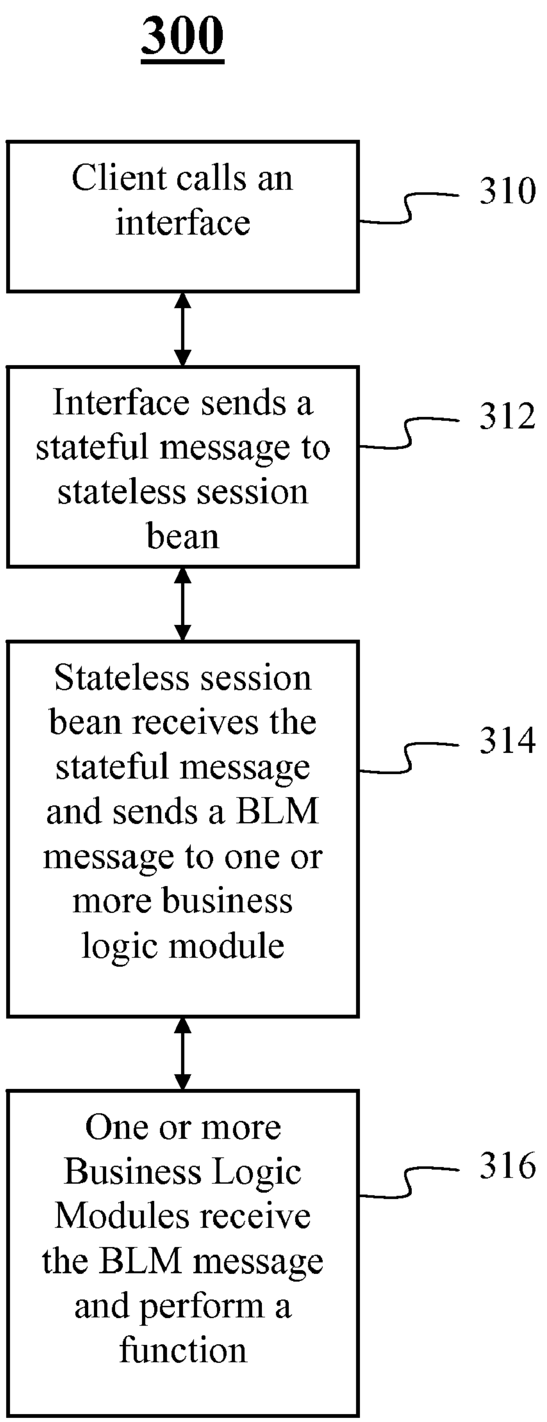
FIG. 3 illustrates a flow chart of a method of implementing web services with service oriented architecture.

FIG. 3 is a flow chart illustrating a method 300 of implementing the present disclosure. At a first block 310, the method includes the client calling an interface. At block 312 the method provides for the interface sending a stateful message to a stateless session bean. At a block 314, the stateless session bean receives the stateful message and sends a message to one or more BLMs. At a block 316, the BLM receives the message and performs the logic or task associated with that BLM. In some embodiments, the client interface may be one of a JMS, Web Services, and/or RMI client. These clients make requests via a message driven bean, web services, and RMI components, respectively. The stateless session bean insulates these components, and consequently their clients, from the underlying functionality enabled by the BLM. The stateless session bean is operable to make the request of the appropriate one or more BLMs and to receive any returned communication or information from the BLMs. The stateless session beans then communicate the information to the clients, JAVA, Web Services, and RMI, via the support components.

The system described above may be implemented on any general-purpose computer with sufficient processing power, memory resources, and network throughput capability to handle the necessary workload placed upon it. A typical, general-purpose computer system suitable for implementing one or more embodiments disclosed herein includes a processor (which may be referred to as a central processor unit or CPU) that is in communication with memory devices including secondary storage, read only memory (ROM), random access memory (RAM), input/output (I/O) devices, and network connectivity devices. The processor may be implemented as one or more CPU chips.

The secondary storage is typically comprised of one or more disk drives or tape drives and is used for non-volatile storage of data and as an over-flow data storage device if RAM is not large enough to hold all working data. Secondary storage may be used to store programs which are loaded into RAM when such programs are selected for execution. The ROM is used to store instructions and perhaps data which are read during program execution. ROM is a non-volatile memory device which typically has a small memory capacity relative to the larger memory capacity of secondary storage. The RAM is used to store volatile data and perhaps to store instructions. Access to both ROM and RAM is typically faster than to secondary storage.

I/O devices may include printers, video monitors, liquid crystal displays (LCDs), touch screen displays, keyboards, keypads, switches, dials, mice, track balls, voice recognizers, card readers, paper tape readers, or other well-known input devices. The network connectivity devices may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices may enable the processor to communicate with an Internet or one or more intranets. With such a network connection, it is contemplated that the processor might receive information from the network, or might output information to the network in the course of performing the above-described method steps. Such information, which is often represented as a sequence of instructions to be executed using the processor, may be received from and outputted to the network, for example, in the form of a computer data signal embodied in a carrier wave Such information, which may include data or instructions to be executed using the processor for example, may be received from and outputted to the network, for example, in the form of a computer data baseband signal or signal embodied in a carrier wave. The baseband signal or signal embodied in the carrier wave generated by the network connectivity devices may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor executes instructions, codes, computer programs, scripts which it accesses from hard disk, floppy disk, optical disk (these various disk based systems may all be considered secondary storage), ROM, RAM, or the network connectivity devices.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A system comprising:

a first computer storing a business logic module, wherein, when executed by the first computer, the business logic module is programmed to perform a function that promotes an exchange of data responsive to a request from a native, internal application;

the first computer further storing an interface, wherein, when executed by the first computer, the interface is programmed to receive a message from a client, wherein the client is an external client stored on a second computer and comprises an external, non-native application, wherein the message is generated by the external, non-native application, wherein the message calls the business logic module to execute the function, wherein the message comprises a stateful message, and wherein the interface is decoupled from the business logic module; and the first computer further storing a stateless session bean, wherein the stateless session bean, when executed, receives the stateful message from the interface and, responsive to the stateful message, generates a business logic module message that requests the business logic module to perform the function, wherein the business logic module, when executed, creates a result information with the business logic module and returns the result information to the stateless session bean, wherein the stateless session bean further returns the result information to the interface, and wherein the interface further returns the result information to the client.

2. The system of claim 1, wherein the result information indicates the success or failure of the function.

3. The system of claim 1, wherein the function comprises at least one of the group of functions consisting of: retrieving data from a database to form retrieved data, and the retrieved data is the result information; modifying data from a database to form modified data, and the modified data or the success or failure of the modifying is the result information.

4. The system of claim 1, wherein the interface, the stateless session bean, and the business logic module are encapsulated in a wrapper, and wherein the client is programmed to access the interface, the stateless session bean, and the business logic module using the wrapper.

5. The system of claim 1, wherein the interface is a message driven bean.

6. The system of claim 1, wherein the interface is a web service.

7. The system of claim 1, wherein the interface is a remote message invocation.

8. The system of claim 1, wherein the stateless session bean performs the function of the business logic module.

9. A computer implemented method for accessing a business logic module stored on and executable by a first computer, wherein the business logic module is programmed to perform a function that promotes an exchange of data responsive to a request from a native, internal application, the method comprising:

receiving, at an interface executing on the first computer, a message from a client executing on a second computer, wherein the message is generated by an external, non-native application, wherein the message calls the business logic module to execute the function, wherein the message comprises a stateful message, and wherein the interface is decoupled from the business logic module;

receiving the stateful message at a stateless session bean between the interface and the business logic module, wherein the stateless session bean is executing on the first computer;

responsive to the stateful message, generating a business logic module message at the stateless session bean, wherein the business logic module message requests the business logic module to perform the function;

creating a result information with the business logic module;

returning the result information from the business logic module to the stateless session bean;

returning the result information from the stateless session bean to the interface;

and returning the result information from the interface to the client.

10. The method of claim 9, further comprising:

performing the function to a database with the business logic module to create the result information.

11. The method of claim 10, wherein the result information indicates the success or failure of the function.

12. The method of claim 10, wherein the function comprises at least one of the group of functions consisting of: retrieving data from a database to form retrieved data, and the retrieved data is the result information; modifying data from a database to form modified data, and the modified data or the success or failure of the modifying is the result information.

13. The method of claim 9, wherein the interface, the stateless session bean, and the business logic module are encapsulated in a wrapper, and the client accesses the interface, the stateless session bean, and the business logic module using the wrapper.

14. The method of claim 9, wherein the interface is a message driven bean.

15. The method of claim 9, wherein the interface is a web service.

16. The method of claim 9, wherein the interface is a remote message invocation.

17. The method of claim 9, wherein the stateless session bean performs the function of the business logic module.

* * * * *